United States Patent
Lee et al.

(10) Patent No.: US 10,163,787 B2
(45) Date of Patent: Dec. 25, 2018

(54) SEMICONDUCTOR STRUCTURE

(71) Applicant: TAIWAN SEMICONDUCTOR MANUFACTURING COMPANY, LTD., Hsinchu (TW)

(72) Inventors: Hui Yu Lee, Hsinchu (TW); Feng Wei Kuo, Zhudong Township (TW); Jui-Feng Kuan, Zhubei (TW); Yi-Kan Cheng, Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 48 days.

(21) Appl. No.: 15/639,379

(22) Filed: Jun. 30, 2017

(65) Prior Publication Data

US 2017/0300611 A1 Oct. 19, 2017

Related U.S. Application Data

(60) Continuation of application No. 14/698,168, filed on Apr. 28, 2015, now Pat. No. 9,698,099, which is a
(Continued)

(51) Int. Cl.
*H01L 23/528* (2006.01)
*H01L 23/522* (2006.01)
(Continued)

(52) U.S. Cl.
CPC ............ *H01L 23/528* (2013.01); *G03F 1/02* (2013.01); *G03F 1/70* (2013.01); *G06F 17/50* (2013.01);
(Continued)

(58) Field of Classification Search
CPC ... H01L 23/528; H01L 23/66; H01L 23/5226; H01L 2223/6638; H01L 2924/0002;
(Continued)

(56) References Cited

U.S. PATENT DOCUMENTS 5,872,380 A 2/1999 Rostoker et al.
7,943,967 B2 * 5/2011 Becker ............... H01L 27/0207
257/206
(Continued)

*Primary Examiner* — Joseph C Nicely
*Assistant Examiner* — Thai T Vuong
(74) *Attorney, Agent, or Firm* — Hauptman Ham, LLP

(57) ABSTRACT

The semiconductor structure includes a first conductive path including first and second segments. The first segment is in a first conductive layer. The second segment is in a second conductive layer. The first and second segments are electrically connected. The semiconductor structure includes a second conductive path including third and fourth segments. The third segment is in the first conductive layer. The fourth segment is in the second conductive layer. The third and fourth segments are electrically connected. The semiconductor structure includes a third conductive path between the first conductive path and the second conductive path, the third conductive path includes fifth and sixth segments. The fifth segment is in the second conductive layer. The sixth segment is in the first conductive layer. The fifth and sixth segments are electrically connected. An area of the first conductive layer between the first and third segments is free of the sixth segment.

20 Claims, 8 Drawing Sheets

Related U.S. Application Data division of application No. 13/650,859, filed on Oct. 12, 2012, now Pat. No. 9,053,255.

(51) Int. Cl.

| | | |
|---|---|---|
| *H01L 23/532* | (2006.01) | |
| *H01L 21/768* | (2006.01) | |
| *G06F 17/50* | (2006.01) | |
| *G03F 1/00* | (2012.01) | |
| *G03F 1/70* | (2012.01) | |
| *H01L 23/66* | (2006.01) | |
| *G03F 1/38* | (2012.01) | |

(52) U.S. Cl.
CPC ...... *G06F 17/5081* (2013.01); *H01L 23/5226* (2013.01); *H01L 23/66* (2013.01); *G03F 1/38* (2013.01); *G06F 2217/82* (2013.01); *H01L 2223/6638* (2013.01); *H01L 2924/0002* (2013.01)

(58) Field of Classification Search
CPC ........ G06F 17/50; G06F 17/5081; G03F 1/38; G03F 1/70; G03F 1/02
USPC ....................................................... 257/773
See application file for complete search history.

(56) References Cited

U.S. PATENT DOCUMENTS

| | | |
|---|---|---|
| 2005/0023656 A1* | 2/2005 | Leedy ..................... B81B 7/02 257/678 |
| 2005/0144582 A1 | 6/2005 | Venkatraman et al. |
| 2005/0183049 A1* | 8/2005 | Ohba ................... G06F 17/5036 716/112 |
| 2006/0097399 A1* | 5/2006 | Hatano ............... G06F 17/5068 257/773 |
| 2006/0184908 A1 | 8/2006 | Minami et al. |
| 2006/0226451 A1 | 10/2006 | Davies |
| 2007/0083833 A1* | 4/2007 | Bothra ................ G06F 17/5077 257/773 |
| 2007/0106968 A1 | 5/2007 | Culp et al. |
| 2009/0037852 A1 | 2/2009 | Kobayashi et al. |
| 2009/0278569 A1* | 11/2009 | Taoka ..................... E21B 43/24 326/101 |
| 2009/0307649 A1 | 12/2009 | Pramanik et al. |
| 2010/0015805 A1 | 1/2010 | Mayer et al. |
| 2010/0261346 A1 | 10/2010 | Chun et al. |
| 2010/0295183 A1 | 11/2010 | Sandhu et al. |
| 2011/0294297 A1 | 12/2011 | Sukekawa |
| 2012/0037997 A1* | 2/2012 | Chen ....................... G11C 8/08 257/369 |
| 2012/0054696 A1 | 3/2012 | Su et al. |
| 2012/0119283 A1 | 5/2012 | Lee |

* cited by examiner

SEMICONDUCTOR STRUCTURE

PRIORITY CLAIM

The present application is a continuation of U.S. application Ser. No. 14/698,168, filed Apr. 28, 2015, which is a divisional of U.S. application Ser. No. 13/650,859, filed Oct. 12, 2012, now U.S. Pat. No. 9,053,255, issued Jun. 9, 2015, which are incorporated herein by reference in their entireties.

BACKGROUND

Integrated circuit (IC) fabrication processes include, among other things, lithographic processes that transfer predetermined IC layout patterns provided on masks to various layers of materials for forming different elements on a substrate. In some applications, the exposure resolution of a lithographic process is limited by many factors such as the light source used and the precision of the lenses, etc. In some semiconductor fabrication processes, double or multiple exposures performed in conjunction with two or more masks for the same layer of material are used to provide an equivalent exposure resolution finer than that can be reached by performing a single exposure. One example double-exposure technology is referred to as double patterning technology (DPT), where layout patterns are assigned to two different masks for two consecutively performed lithographic processes for the same layer of material. However, misalignment between the two different masks (measurable by the relative displacement of the resulting patterns on the wafer) exists, which leads to degraded performance or even failure of the resulting IC.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
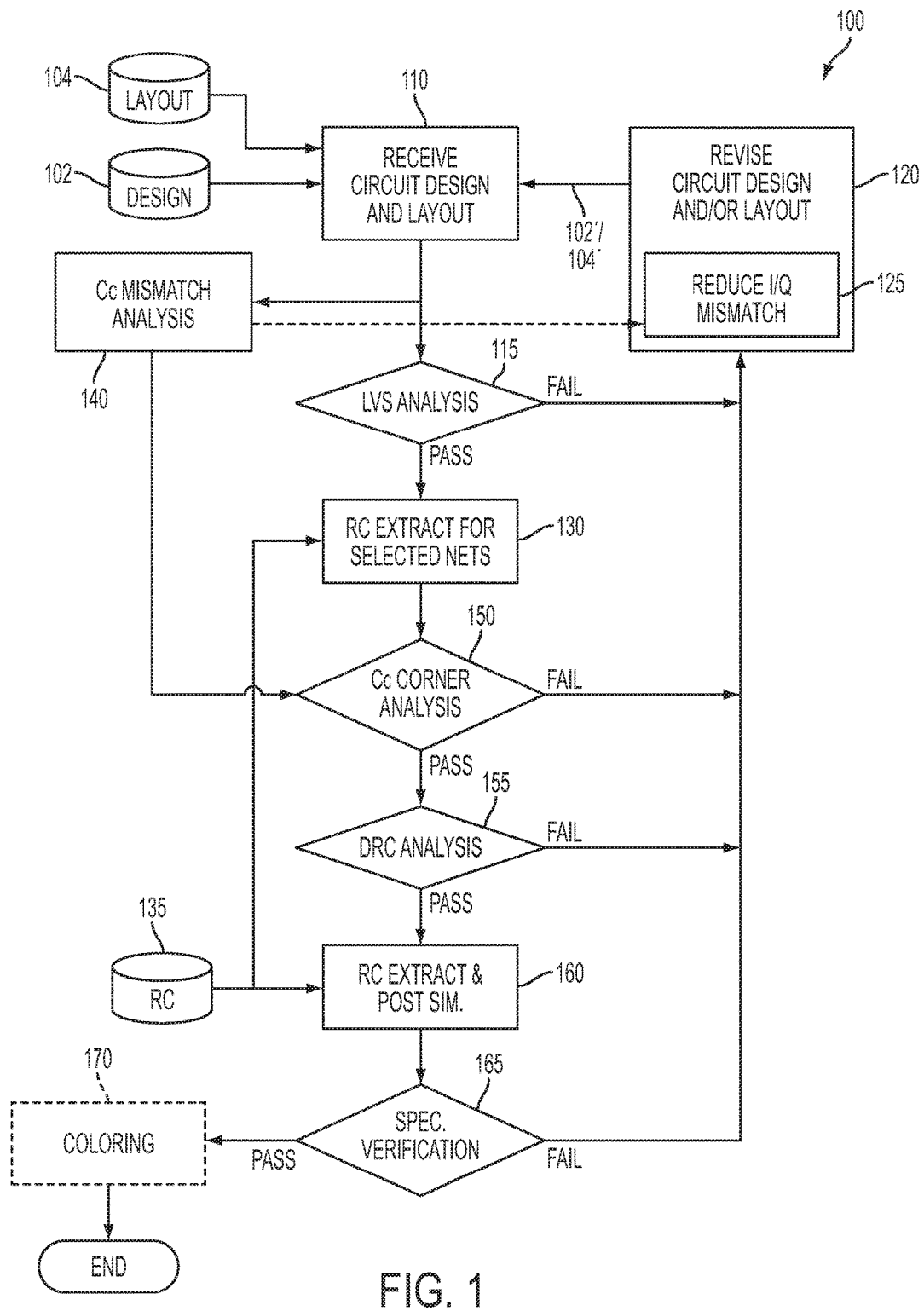
FIG. 1 is a flow chart of a method of generating masks for making an IC in accordance with one or more embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

Moreover, spatially relative terms, for example, "lower," "upper," "horizontal," "vertical," "above," "below," "up," "down," "top," "bottom," "left," "right," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1 is a flow chart of a method 100 of generating a set of masks for making an IC in accordance with one or more embodiments. It is understood that additional processes may be performed before, during, and/or after the method 100 depicted in FIG. 1, and that some other processes may only be briefly described herein. In some embodiments, the method 100 is, partially or entirely, performed by a computer system 800 (FIG. 8) having a hardware processor 810 (FIG. 8) executing a set of computer readable instructions (such as computer program code 822 in FIG. 8).

As depicted in FIG. 1, in operation 110, a circuit design 102 and corresponding layout 104 of the IC is received by the processor 810. In some embodiments, the corresponding layout 104 is generated by the processor 810 based on the received circuit design 102, and thus the receiving of the layout 104 is omitted.

In some embodiments, the circuit design 102 of the IC is an electronic file compiled in a circuit schematic format (i.e., an original circuit schematic) that is recognizable by a schematic circuit-designing software program. The processor 810 is capable of receiving the original circuit schematic and converting the original circuit schematic into an original netlist recognizable by a predetermined simulation software program. A netlist is a text description of a circuit design, such as the circuit design 102, defining instance parameters for modeling a device and interconnection between the device and other nodes or devices. In some embodiments, the circuit design 102 of the IC is presented as an electronic file compiled in a netlist format (i.e., the original netlist), and thus the format-conversion by the processor 810 is omitted. In some embodiments, the predetermined simulation software program is HSPICE or PSPICE. In some embodiments, the predetermined simulation software program is capable of recognizing netlists compatible with Berkeley Short-channel IGFET Model (BSIM) standard. In at least one embodiment, the original netlist is recognizable by HSPICE and compatible with BSIM standard version 4.5 or later.

In some embodiments, layout 104 contains information regarding the masks having layout patterns for manufacturing the IC. Each mask corresponds to a portion of or all features to be formed in one of many layers of materials, such as an epitaxial layer, a metal layer, a polysilicon layer, or a dielectric layer, etc. In some embodiments, two or more masks correspond to a common layer of material of the IC and are used for a multiple-exposure process. In some embodiments, layout 104 is compiled in an electronic format including a Graphical Data System II (GDS II) format or an Open Artwork System Interchange Standard (OASIS) format.

In operation 115, a Layout-Versus-Schematic (LVS) analysis is performed. In some embodiments, the LVS analysis includes generating netlists based on the circuit design 102 and the layout 104 and comparing the consistency between the generated netlists. If the circuit design 102 and the layout 104 fail the LVS analysis, the process moves on to operation 120 and the circuit design 102 and/or the layout 104 are revised accordingly. The revised circuit design 102' and/or the revised layout 104' are then sent to the processor 810 (operation 110), and the LVS analysis (operation 115) is repeated based on the latest circuit design (102 or 102' if applicable) and the latest layout (104 or 104' if applicable).

In some embodiments, the circuit includes conductive paths for carrying an in-phase (I) signal and a quadrature (Q) signal corresponding to the in-phase signal, and operation 120 includes modifying the layout patterns to reduce I/Q signal mismatched caused by misalignment of masks (block 125). Details regarding the modification of the layout patterns are further described in conjunction with FIGS. 4A-4C, 5A-5E, and 6A-6E.

In operation 115, if the latest circuit design (102 or 102' if applicable) and the latest layout (104 or 104' if applicable) pass the LVS analysis, the process moves on to operation 130, where a first Resistance-Capacitance (RC) extraction process is performed on one or more selected nets (sometimes also referred to as "nodes") of the circuit design 102 or 102'. In some embodiments, the first RC extraction process is performed based on layout patterns in the layout 104 or 104' corresponding to the selected nets and an RC technology file 135. The RC technology file 135 includes information regarding generalized dimensional characteristics of devices or elements of the IC under a predetermined manufacturing technology node. In some embodiments, the selected nets comprises nets corresponding to a plurality of conductive paths for carrying a first pair of differential signals representative of the in-phase (I) signal and a second pair of differential signals representative of the quadrature (Q) signal corresponding to the in-phase signal, such as conductive paths 212, 214, 222, and 224 depicted in FIGS. 2A and 2B.

In operation 140, a coupling capacitance mismatch analysis is performed on the selected nets. The coupling capacitance mismatch analysis comprises calculating one or more coupling capacitance values for the selected nets, such as conductive paths 212, 214, 222, and 224 depicted in FIGS. 2A and 2B, based on the circuit design 102 or 102' and the layout 104 or 104'. The results of the coupling capacitance mismatch analysis are subsequently used during a coupling capacitance corner analysis (operation 150) and optionally for revising the circuit design and/or layout to reduce I/Q mismatch (block 125). Details regarding the coupling capacitance mismatch analysis are further described in conjunction with FIGS. 2A-2B and 3.

The process then moves on to operation 150 for performing the coupling capacitance corner analysis. The coupling capacitance corner analysis determines if the coupling capacitance value of any of the selected nets exceeds a predetermined threshold value. In some embodiments, the coupling capacitance corner analysis 150 includes converting a predetermined RC corner condition, i.e., a predetermined threshold value for RC loading, into a predetermined threshold value of coupling capacitance based on the results of the first RC extraction (operation 130). In some embodiments, the coupling capacitance corner analysis 150 further includes comparing the coupling capacitance value from the coupling capacitance mismatch analysis 140 with the predetermined threshold value of coupling capacitance in order to determine if the coupling capacitance value of the selected nets exceeds the predetermined threshold value under the simulated mask misalignment condition. In at least one embodiment, a visualized presentation of the coupling capacitance of the selected nets and the predetermined threshold value are displayed by a display unit (840 in FIG. 8) for the design engineers' convenience. Details regarding the coupling capacitance mismatch analysis 140 are further explained in conjunction with FIG. 3.

If the result of operation 150 is that the selected nets fail the coupling capacitance corner analysis, the process moves on to operation 120 for revising the circuit design 102 or 102' and/or the layout 104 or 104'. If the result of operation 150 is that the selected nets pass the coupling capacitance corner analysis, the process moves on to operation 155 for performing a Design Rule Check (DRC) Analysis 155.

In operation 155, the layout design 104 or 104' is checked against a set of predetermined criteria regarding spatial relationships among various layout patterns, such as corner-to-corner distance, end-to-end distance, or run-to-end distance between two layout patterns. In some embodiments, the DRC analysis is performed by executing a DRC software including CALIBRE® by MENTOR GRAPHICS, HERCULES® by SYNOPSYS, or DIVA, DRACULA, ASSURA, AND PVS® by CADENCE DESIGN SYSTEMS.

If the result of operation 155 is that the layout 104 or 104' fails the DRC analysis, the process moves on to operation 120 for revising the circuit design 102 or 102' and/or the layout 104 or 104'. If the result of operation 155 is that the layout 104 or 104' pass the DRC analysis, the process moves on to operation 160 for performing a second RC Extraction process and a post-layout simulation.

In operation 160, the second RC Extraction process is performed on the layout 104 or 104' for the entire IC by referring to the RC technology file 135. Also, the post-layout simulation is performed based on the results of the second RC extraction process and the circuit design 102 or 102'. In some embodiments, the post-layout simulation is performed by executing a software program such as HSPICE® by SYNOPSYS, SPECTRE® by CADENCE DESIGN SYSTEMS, or other commercially-available post-layout simulation software programs.

After the second RC extraction and post-layout simulation (operation 160), the process moves on to operation 165, where the result of the post-layout simulation is compared with a predetermined set of electrical characteristics to determine if the circuit design 102 or 102' and the layout 104 and 104' satisfy a predetermined set of requirements of electrical characteristics. If the result of operation 165 is that the post-layout simulation result fails to meet the predetermined set of requirements, the process moves on to operation 120 for revising the circuit design 102 or 102' and/or the layout 104 or 104'. If the result of operation 165 is that the post-layout simulation result satisfies the predetermined set of requirements, masks for manufacturing the IC are prepared based on the layout 104 or 104'.

Optionally, if multiple-exposure technology is used to manufacture one or more layers of materials of the IC, some layout patterns of the layout 104 or 104' are further assigned to two or more different masks in operation 170. The assignment of layout patterns to two or more different masks is also referred to as a coloring process, because the automation of the assignment of layout patterns resembles a graph coloring analysis in graph theory.

The coupling capacitance mismatch analysis (operation 140) is further described below in conjunction with FIGS. 2A-2B and 3.

Figure 2A:
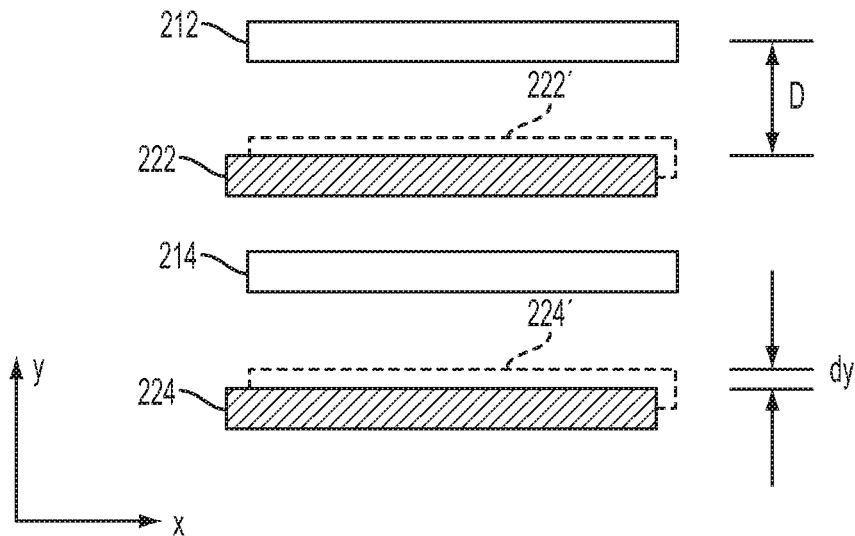
FIGS. 2A and 2B are top views of layout patterns of conductive paths in accordance with one or more embodiments.

FIG. 2A is a top view of mask patterns of a first, second, third, and fourth conductive paths 212, 214, 222, and 224 in accordance with one or more embodiments. These conductive paths 212, 214, 222, and 224 extend along a first direction x and are arranged according to an order, along a second direction y perpendicular to the first direction x, of the first, third, second, and fourth conductive paths 212, 222, 214, and 224.

The first conductive path 212 and the second conductive path 214 are configured to carry the first pair of differential signals representative of an in-phase (I) signal. In some embodiments, the first conductive path 212 is referred to as an I+ signal path, and the second conductive path 214 is referred to as an I− signal path. The third conductive path 222 and the fourth conductive path 224 are configured to carry a second pair of differential signals representative of a quadrature (Q) signal corresponding to the in-phase (I) signal. In some embodiments, the third conductive path 222 is referred to as a Q+ signal path, and the fourth conductive path 214 is referred to as a Q− signal path.

The conductive paths 212, 222, 214, and 224 are separated by a predetermined pitch D. In some embodiments, the conductive paths are grouped as a first group of conductive paths including conductive paths 212 and 214 and a second group of conductive paths including conductive paths 222 and 224. Layout patterns corresponding to the first group of conductive paths 212 and 214 are in a first mask, and layout patterns corresponding to the second group of conductive paths 222 and 224 are in a second mask. In at least one embodiment, the first and second masks are misaligned by, among other things, a distance dy along the second direction y, and thus the resulting conductive paths 222 and 224 of the IC is formed at slightly shifted positions from their corresponding ideal positions 222' and 224'. In other words, the misalignment of the masks results in misalignment of the resulting conductive paths. The misaligned conductive paths further cause coupling capacitance variations. However, the level of mask misalignment is usually random and unpredictable. As such, the magnitudes and phases of the I/Q signals on the conductive paths 212, 214, 222, and 224 are thus distorted in an unpredictable manner.

In order to consider all possible scenarios with regard to the misalignment of masks, in at least one embodiment, during the coupling capacitance mismatch analysis (operation 140), a table is generated. The table lists combinations of every conductive path of the first and second groups of conductive paths and types of mask misalignment between every one of the masks against the remaining of the masks. Table I is generated based on the conductive paths depicted in FIG. 2A.

TABLE I

| Conditions | I+ Path | Q+ Path | I− Path | Q− Path |
|---|---|---|---|---|
| Perfectly aligned | C | 2C | 2C | C |
| Mask (Q+, Q−) shift up | C+ | 2C | 2C | C+ |
| Mask (Q+, Q−) shift down | C− | 2C | 2C | C− |
| Mask (Q+) shift up | C+ | 2C | 2C− | C |
| Mask (Q+) shift down | C− | 2C | 2C+ | C |
| Mask (I−) shift up | C | 2C+ | 2C | C− |
| Mask (I−) shift down | C | 2C− | 2C | C+ |
| Mask (Q−) shift up | C | 2C | 2C+ | C+ |
| Mask (Q−) shift down | C | 2C | 2C− | C− |

In Table I, the left-most column includes a perfectly aligned condition and various types of misalignment condition, including (1) the mask containing layout patterns for Q+ signal path (conductive path 222) and Q− signal path (conductive path 224) are shifted upward with respect to other conductive paths; (2) the mask containing layout patterns for Q+ signal path and Q− signal path are shifted downward with respect to other conductive paths; (3) the mask containing layout pattern for Q+ signal path is shifted upward with respect to other conductive paths; (4) the mask containing layout pattern for Q+ signal path is shifted downward with respect to other conductive paths; (5) the mask containing layout pattern for I− signal path (conductive path 212) is shifted upward with respect to other conductive paths; (6) the mask containing layout pattern for I− signal path (conductive path 214) is shifted downward with respect to other conductive paths; (7) the mask containing layout pattern for Q− signal path is shifted upward with respect to other conductive paths; and (8) the mask containing layout pattern for Q− signal path is shifted downward with respect to other conductive paths.

The body of Table I itemizes the effects to individual conductive paths under the conditions enumerated in the left-most column. The label "C" refers to a unit capacitance value of the coupling capacitance observed by a conductive path having only one neighboring conductive paths. The label "2C" refers to a conductive path between two neighboring conductive paths and thus the coupling capacitance observed on the conductive path is twice the unit capacitance value C. The "+" or the "−" signs refer to the increase or decrease of the coupling capacitance which the corresponding conductive path observes under the enumerated conditions. As a general rule, if two conductive paths become closer in distance to each other as a result of mask misalignment, the coupling capacitance becomes greater, and vice versa. Also, if a particular conductive path is only shifted between two adjacent conductive paths as a result of mask misalignment, the coupling capacitance observed by the conductive path increases due to being closer to one of the two adjacent conductive paths and decreases due to being farther from the other one of the two adjacent conductive paths, and the combined effect is considered as having no net effect to the coupling capacitance of the conductive path.

Therefore, a table is generated to list combinations of one or more predetermined conductive paths and types of misalignment between a corresponding one of the masks against the remaining of the masks. The table is usable to identify a subset of the combinations that do not correspond to shifting a corresponding conductive path between two adjacent conductive paths.

Figure 2B:
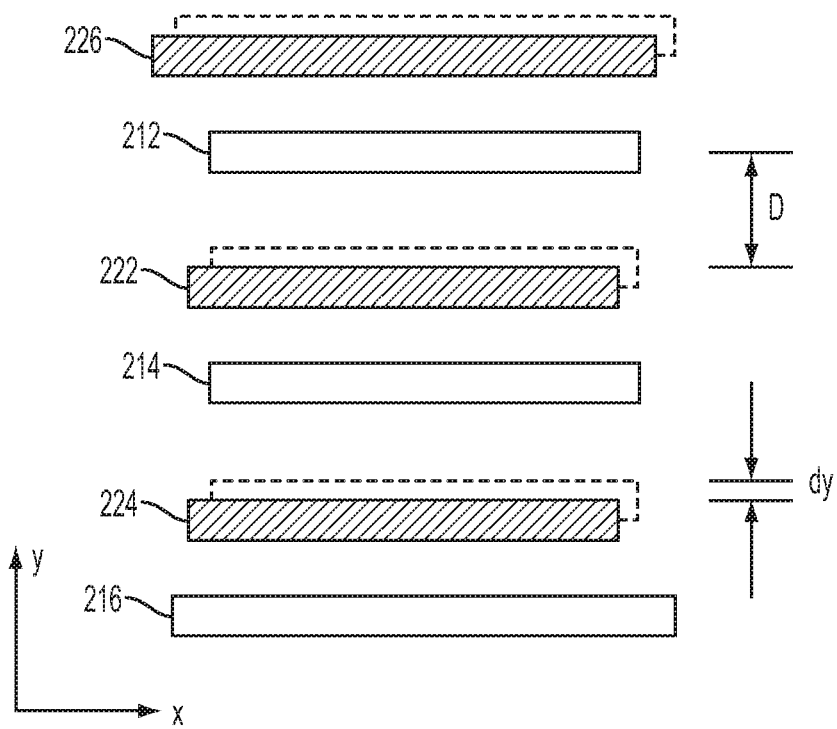

FIG. 2B is a top view of layout patterns of a first, second, third, and fourth conductive paths 212, 214, 222, and 224, as well as a first dummy conductive path 216 and a second dummy conductive path 226 in accordance with one or more embodiments. These conductive paths 212, 214, 216, 222, 224, and 226 extend along the first direction x and are arranged according to an order, along the second direction y, of the second dummy path 226, the first, third, second, and fourth conductive paths 212, 222, 214, and 224, and the first dummy path 216. In other words, the first, second, third, and fourth conductive paths 212, 214, 222, and 224 are horizontally positioned between the first dummy conductive path 216 and the second dummy conductive path 226. The first dummy path 216 is considered as a member of the first group of conductive paths, and the second dummy path 226 is considered as a member of the second group of conductive paths.

In some embodiments, all possible combinations with regard to the misalignment of masks are compiled in a form of a table (Table II).

TABLE I

| Conditions | I+ Path | Q+ Path | I− Path | Q− Path |
|---|---|---|---|---|
| Perfectly aligned | 2C | 2C | 2C | 2C |
| Mask (Q+, Q−) shift up | 2C+ | 2C | 2C | 2C |
| Mask (Q+, Q−) shift down | 2C− | 2C | 2C | 2C |
| Mask (Q+) shift up | 2C+ | 2C | 2C− | 2C |
| Mask (Q+) shift down | 2C− | 2C | 2C+ | 2C |
| Mask (I−) shift up | 2C | 2C+ | 2C | 2C− |
| Mask (I−) shift down | 2C | 2C− | 2C | 2C+ |
| Mask (Q−) shift up | 2C | 2C | 2C+ | 2C |
| Mask (Q−) shift down | 2C | 2C | 2C− | 2C |

The body of Table II also itemized the effects to individual conductive paths under the conditions enumerated in the left-most column for the conductive paths depicted in FIG. 2B. Compared with the Table I for the conductive paths depicted in FIG. 2A, because of the existence of the dummy conductive paths 216 and 226, the coupling capacitance of the four conductive paths 212, 222, 214, and 224 that used to carry I and Q signals are all 2C under the perfectly aligned condition. Similar to the application of Table I, Table II is usable to identify a subset of the combinations that do not correspond to shifting a corresponding conductive path between two adjacent conductive paths.

Figure 3:
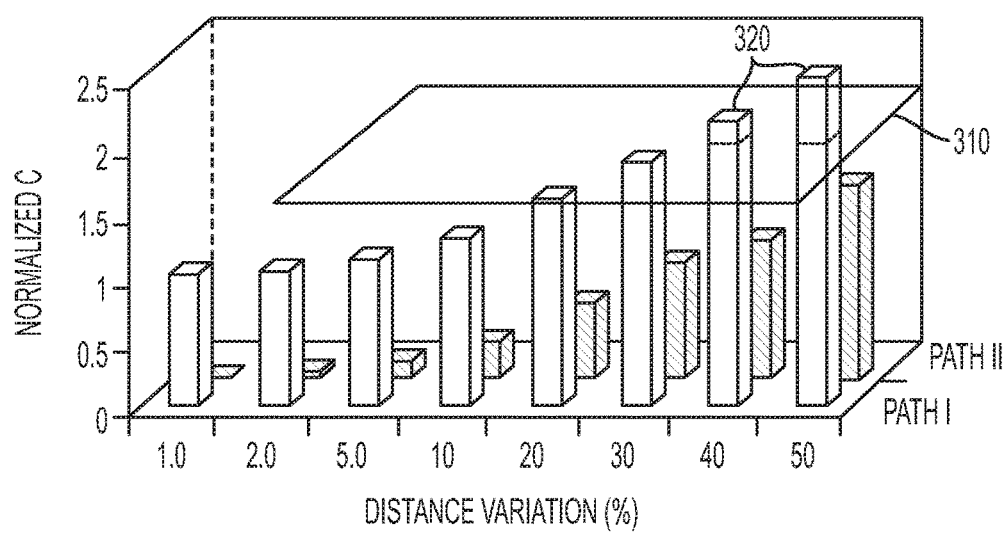
FIG. 3 is a column chart of an example visualized presentation of coupling capacitance values versus various levels of mask misalignment in accordance with one or more embodiments.

FIG. 3 is a column chart of example visualized presentation of coupling capacitance values versus various levels of misalignment of the masks in accordance with one or more embodiments. In FIG. 3, the "distance variation" is calculated by dividing the level of misalignment dy by the pitch D. The "normalized C" represents the normalized capacitance value of one or more conductive paths under review by a reviewing engineer. "Path I" and "Path II" refer to two sets of calculated normalized coupling capacitance values. In some embodiments, "Path I" and "Path II" correspond to two different conductive paths among the conductive paths being analyzed. In some embodiments, "Path I" and "Path II" correspond to the same conductive path being analyzed but having different layout (such as "Path I" for the original layout 104 and "Path II" for the revised layout 104').

In addition, as depicted in FIG. 3, a reference plane 310 indicating a predetermined threshold value of coupling capacitance based on the predetermined RC corner condition is also depicted in the column chart to facilitate the coupling capacitance corner analysis (operation 150). In the embodiment depicted in FIG. 3, the columns 320 of the normalized capacitance of "Path I," having a misalignment level (as represented by the distance variation) of 40% or 50%, touches and cross the reference plane 310. Therefore, the layout corresponding to "Path I" fails the Coupling Capacitance Corner Analysis, and the circuit design 102 or 102' and/or the layout 104 or 104' should be revised in operation 120. Although only one reference plane 310 is depicted in FIG. 3, in some embodiments, two or more reference planes indicative of various predetermined threshold values of coupling capacitance based on various RC corner conditions are depicted in the clustered column chart.

Various approaches are available to revise the layout in order to reduce the impact to the coupling capacitance caused by misalignment of masks (block 125 in FIG. 1). After a determination that the coupling capacitance of one or more conductive paths is greater than the predetermined threshold value, the layout patterns of the conductive paths are modified to enlarge an overall vertical distance between the first group of conductive paths 212 and 214 and the second group of conductive paths 222 and 224.

Figure 4A:
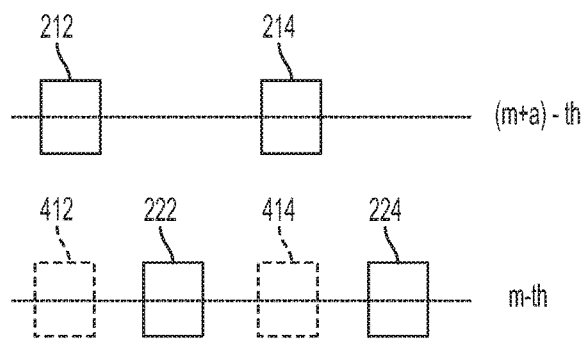
FIGS. 4A-4C are cross-sectional views of conductive paths whose layout has been revised in accordance with one or more embodiments.

FIG. 4A is a cross-sectional view of conductive paths 212, 214, 222, and 224 whose layout is revised according to a first approach in accordance with one or more embodiments. The conductive paths 212, 214, 222, and 224 are arranged in the m-th conductive layer in the original layout 104. To further increase the overall vertical distance between the first group of conductive paths 212 and 214 and the second group of conductive paths 222 and 224, the layout patterns corresponding to the first group of conductive paths 212 and 214 are assigned to the (m+a)-th layer, where "a" is a positive integer. In some embodiments, instead of ascending the layout patterns of the first group of conductive paths 212 and 214 to a higher conductive layer, the mask patterns corresponding to the second group of conductive paths 222 and 224 are descended to the (m−b)-th layer, where "b" is a positive integer. In at least one embodiment, the layout patterns of the first group of conductive paths are assigned to a higher conductive layer while the mask patterns of the second group of conductive paths are also assigned to a lower conductive layer.

Along the same rationale, if the first group of conductive paths 212 and 214 are originally in the (m+n)-th conductive layer and the second group of conductive paths 222 and 224 are in the m-th conductive layer, n is a non-negative integer, in some embodiments, the modification of the layout patterns includes performing one or both of (1) assigning the layout patterns corresponding to the first group of conductive paths to the (M+n+a)-th conductive layer of the integrated circuit; and (2) assigning the layout patterns corresponding to the second group of conductive paths to the (M−b)-th conductive layer of the integrated circuit.

Figure 4B:
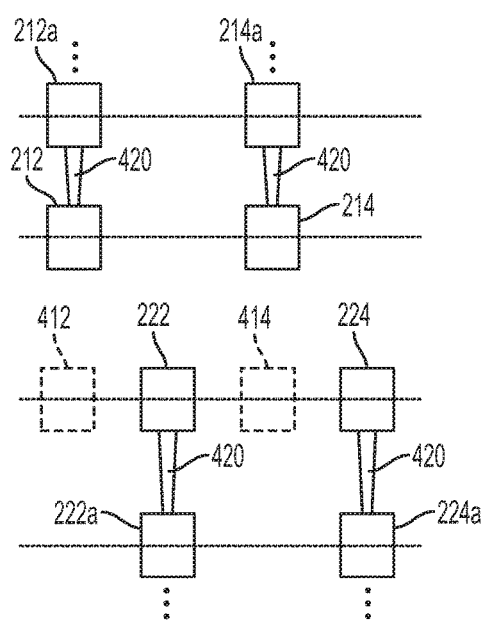

FIG. 4B is a cross-sectional view of conductive paths 212, 214, 222, and 224 whose layout is revised according to a second approach in accordance with one or more embodiments. After the layout patterns of the first group of conductive paths 212 and 214 and the second group of conductive paths 222 and 224 are assigned to different conductive layers as depicted in FIG. 4A, the layout patterns corresponding to the first group of conductive paths 212 and 214 are duplicated (as represented by conductive paths 212a and 214a) to one or more masks corresponding to one or more conductive layers above the first group of conductive paths. Also, the layout patterns corresponding to the second group of conductive paths 222 and 224 are duplicated (as represented by conductive paths 222a and 224a) to one or more masks corresponding to one or more conductive layers below the second group of conductive paths. All corresponding conductive paths are electrically connected together by via plugs 420.

Figure 4C:
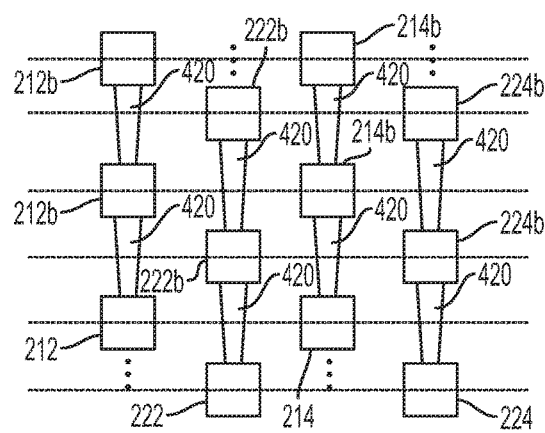

FIG. 4C is a cross-sectional view of conductive paths 212, 214, 222, and 224 whose layout is revised according to a third approach in accordance with one or more embodiments. After the layout patterns of the first group of conductive paths 212 and 214 and the second group of conductive paths 222 and 224 are assigned to different conductive layers as depicted in FIG. 4A, the layout patterns corresponding to the first group of conductive paths 212 and 214 are duplicated (as represented by conductive paths 212*b* and 214*b*) to one or more masks corresponding to one or more first conductive layers. Also, the layout patterns corresponding to the second group of conductive paths 222 and 224 are duplicated (as represented by conductive paths 222*b* and 224*b*) to one or more masks corresponding to one or more second conductive layers. The one or more first conductive layers for the first group of conductive paths 212, 214, 212*b*, and 214*b* are arranged in an interleaving manner with respect to the one or more second conductive layers for the second group of conductive paths 222, 224, 222*b*, and 224*b*. All corresponding conductive paths are electrically connected by via plugs 420.

Figure 5A:
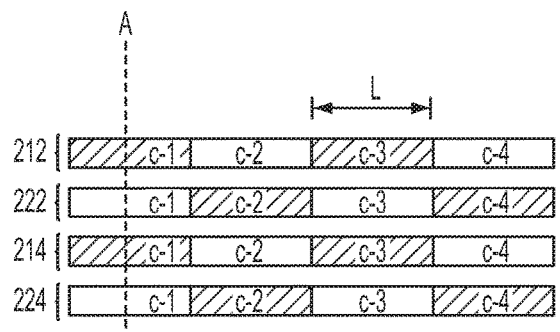
FIGS. 5A-5E and 6A-6E are top views and cross-sectional views of conductive paths whose layout has been revised in accordance with one or more embodiments.

FIG. 5A is a top view of conductive paths 212, 214, 222, and 224 whose layout is revised according to a fourth approach in accordance with one or more embodiments. For example, the first conductive path 212 is divided into a first set of segments 212(*c*-1), 212(*c*-2), 212(*c*-3), and 212(*c*-4); the second conductive path 214 is divided into a second set of segments 214(*c*-1), 214(*c*-2), 214(*c*-3), and 214(*c*-4); the third conductive path 222 is divided into a third set of segments 222(*c*-1), 222(*c*-2), 222(*c*-3), and 222(*c*-4); and the fourth conductive path 224 is divided into a fourth set of segments 224(*c*-1), 224(*c*-2), 224(*c*-3), and 224(*c*-4).

Figure 5B:
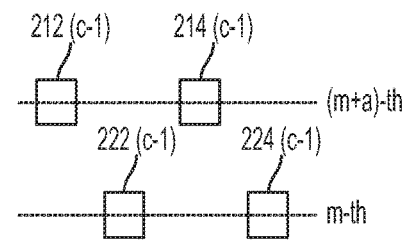

FIG. 5B is a cross-sectional view of conductive paths 212, 214, 222, and 224 taken from line A of FIG. 5A. The layout patterns of the first, second, third, and fourth sets of segments are assigned to two different conductive layers of the IC in a manner that corresponding segments of the first and third sets of segments are in different conductive layers, and corresponding segments of the second and fourth sets of segments are in different conductive layers. In addition, the corresponding segments of the second and third sets of segments are in different conductive layers. For example, the segments 212(*c*-1) and 214(*c*-1) are assigned to (m+a)-th conductive layer, and the segments 222(*c*-1) and 224(*c*-1) are assigned to m-th conductive layer. Moreover, the segments 212(*c*-3), 214(*c*-3), 222(*c*-2), 222(*c*-4), 224(*c*-2), and 222(*c*-4) are assigned to (m+a)-th conductive layer, and the segments 222(*c*-3), 224(*c*-3), 212(*c*-2), 212(*c*-4), 214(*c*-2), and 212(*c*-4) are assigned to m-th conductive layer.

Figure 5C:
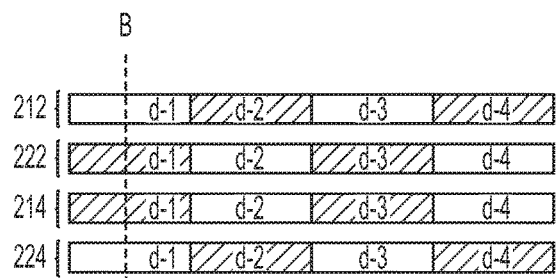

FIG. 5C is a top view of conductive paths 212, 214, 222, and 224 whose layout is revised according to a fifth approach in accordance with one or more embodiments. For example, the first conductive path 212 is divided into a first set of segments 212(*d*-1), 212(*d*-2), 212(*d*-3), and 212(*d*-4); the second conductive path 214 is divided into a second set of segments 214(*d*-1), 214(*d*-2), 214(*d*-3), and 214(*d*-4); the third conductive path 222 is divided into a third set of segments 222(*d*-1), 222(*d*-2), 222(*d*-3), and 222(*d*-4); and the fourth conductive path 224 is divided into a fourth set of segments 224(*d*-1), 224(*d*-2), 224(*d*-3), and 224(*d*-4).

Figure 5D:
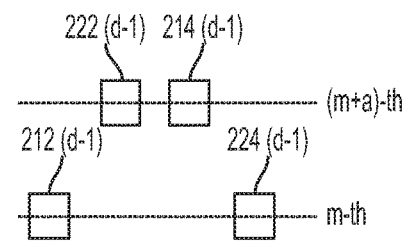

FIG. 5D is a cross-sectional view of conductive paths 212, 214, 222, and 224 taken from line B of FIG. 5C. The mask patterns of the first, second, third, and fourth sets of segments are assigned to two different conductive layers of the IC in a manner that corresponding segments of the first and third sets of segments are in different conductive layers, and corresponding segments of the second and fourth sets of segments are in different conductive layers. In addition, the corresponding segments of the second and third sets of segments are in the same conductive layers. For example, the segments 222(*d*-1) and 214(*d*-1) are assigned to (m+a)-th conductive layer, and the segments 212(*d*-1) and 224(*d*-1) are assigned to m-th conductive layer. Moreover, the segments 212(*d*-2), 212(*d*-4), 214(*d*-2), 214(*d*-4), 222(*d*-3), and 224(*d*-3) are assigned to (m+a)-th conductive layer, and the segments 222(*d*-2), 222(*d*-4), 224(*d*-2), 224(*d*-4), 212(*d*-3), and 214(*d*-3) are assigned to m-th conductive layer.

Figure 5E:
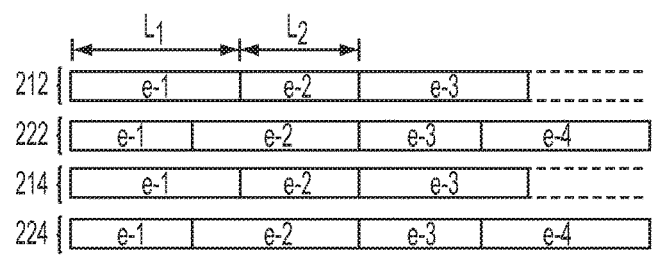
Figure 6A:
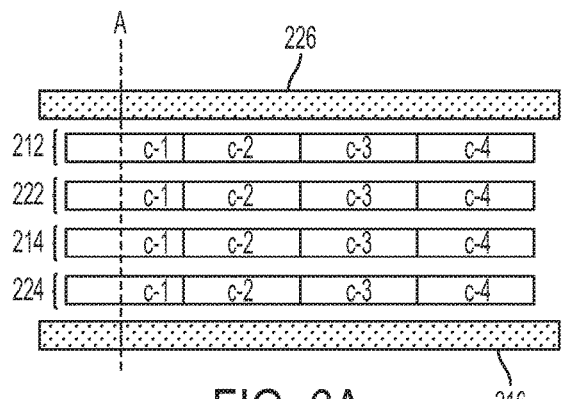
Figure 6B:
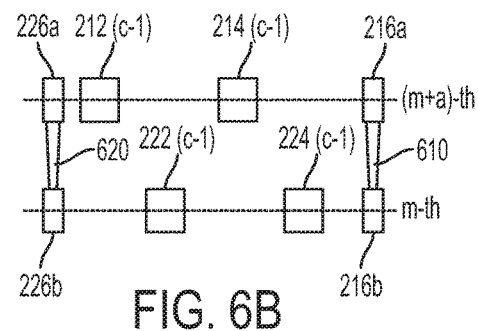
Figure 6C:
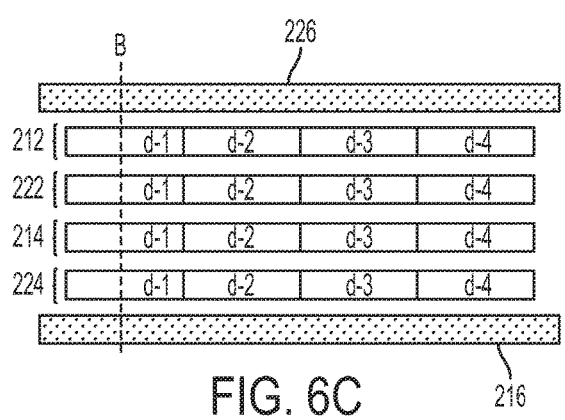
Figure 6D:
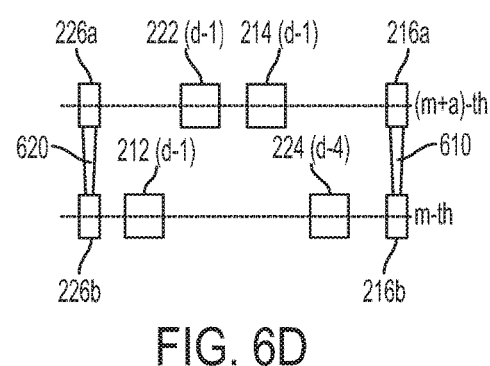
Figure 6E:
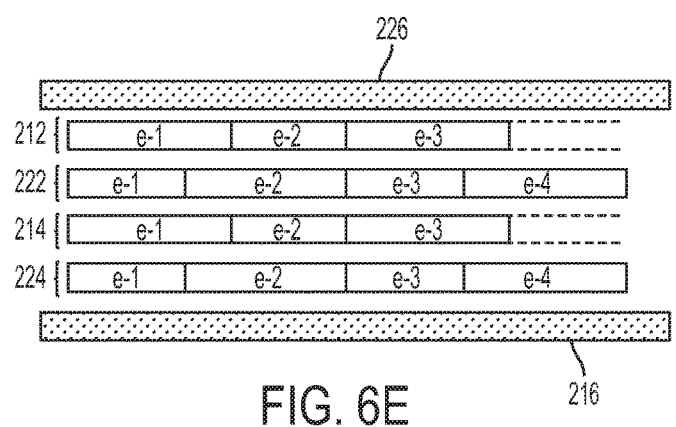

In the embodiments depicted in FIGS. 5A-5D, all segments of the first, second, third, and fourth sets of segments have a predetermined segment length L. FIG. 5E is a top view of conductive paths 212, 214, 222, and 224 whose layout is revised according to either the fourth or the fifth approach in accordance with one or more embodiments. All segments of the first, second, third, and fourth sets of segments have either a first predetermined segment length L1 or a second predetermined segment length L2, and any two consecutive segments of the all segments have different segment lengths.

For example, the first conductive path 212 is divided into a first set of segments 212(*e*-1), 212(*e*-2), and 212(*e*-3); the second conductive path 214 is divided into a second set of segments 214(*e*-1), 214(*e*-2), 214(*e*-3), and 214(*e*-4); the third conductive path 222 is divided into a third set of segments 222(*e*-1), 222(*e*-2), and 222(*e*-3); and the fourth conductive path 224 is divided into a fourth set of segments 224(*e*-1), 224(*e*-2), 224(*e*-3), and 224(*e*-4). In the embodiment depicted in FIG. 5E, segments 212(*e*-1), 212(*e*-3), 214(*e*-1), 214(*e*-3), 222(*e*-2), 222(*e*-4), 224(*e*-2), and 224(*e*-4) has a segment length of L1; and segments 212(*e*-2), 214(*e*-2), 222(*e*-1), 222(*e*-3), 224(*e*-1), and 224(*e*-3) has a segment length of L2.

In some embodiments, the modification of masks according to the methods depicted in FIGS. 5A-5E is recorded by a "slice flag" description recognizable by the layout software program. In at least one embodiment, the "slice flag" description includes information regarding an identifier of the conductive path, a first segment length, a second segment length, mask assignment information for the segments having the first segment length, and mask assignment information for the segments having the second segment length. In some embodiments, the first segment length and the second segment length are recorded as a total length and a splitting ratio.

FIGS. 6A-6E are top views and cross-sectional views of the conductive paths 212, 214, 222, and 224, and the dummy conductive paths 216 (including 216*a* and 216*b*) and 226 (including 226*a* and 226*b*) in accordance with one or more embodiments. The conductive paths 212, 214, 222, and 224 are horizontally positioned between dummy conductive paths 216 and 226. Compared with the embodiments depicted in FIGS. 5A-5E, the first group of conductive paths further includes a first dummy conductive path 216, and the second group of conductive paths further includes a second dummy conductive path 226. The layout patterns corresponding to the first and second conductive dummy paths are assigned in a manner that the first and second conductive dummy paths are in both of the two different conductive layers. For example, the first dummy conductive path 216 includes conductive path 216*a* in the (m+a)-th conductive layer and conductive path 216*b* in the m-th conductive layer; and the second dummy conductive path 226 includes conductive path 226*a* in the (m+a)-th conductive layer and conductive path 226*b* in the m-th conductive layer. The dummy conductive paths 216*a* and 216*b* are positioned one over the other and connected by a plurality of via plugs 610. The dummy conductive paths 226*a* and 226*b* are also positioned one over the other and connected by another plurality of via plugs 620.

Figure 7A:
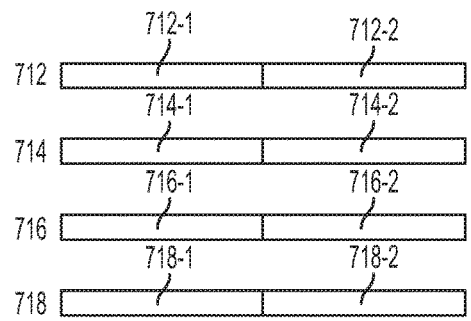
FIG. 7A is a top view of layout patterns of four conductive paths each having two segments in accordance with one or more embodiments.
Figure 7B:
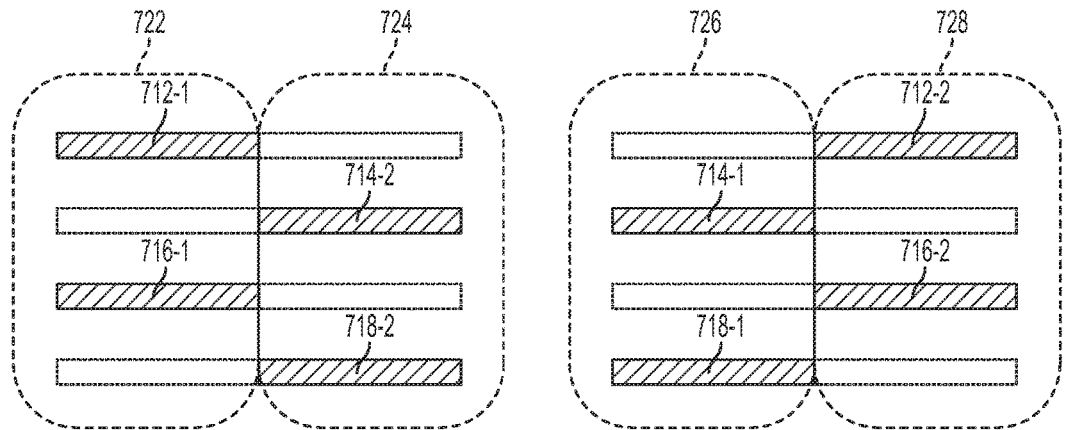
FIG. 7B is a top view of mask assignments for layout patterns of FIG. 7A.
Figure 7C:
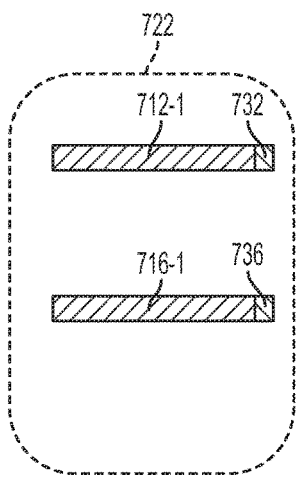
FIG. 7C is a top view of a mask with inclusion of line end patterns in accordance with one or more embodiment.

Furthermore, details of operation 170 in FIG. 1 is further described in conjunction with FIGS. 7A-7C. FIG. 7A is a top view of four sets of line patterns 712, 714, 716, and 718 representative of the conductive paths arranged in parallel and each having two segments in accordance with one or more embodiments. The line patterns 712, 714, 716, and 718 correspond to a portion of the conductive paths described in the embodiments depicted in FIGS. 6A-6E and 7A-7C. The line pattern 712 is divided into two segments 712-1 and 712-2; the line pattern 714 is divided into two segments 714-1 and 714-2; the line pattern 716 is divided into two segments 716-1 and 716-2; and the line pattern 718 is divided into two segments 718-1 and 718-2. Although only two segments for each line pattern 712, 714, 716, and 718 are depicted in FIG. 7A, in some embodiments, each line pattern 712, 714, 716, and 718 is divided into more than two segments. The segments 712-1, 712-2, 716-1, and 716-2 are collectively referred to as a first group of segments, and the segments 714-1, 714-2, 718-1, and 718-2 are collectively referred to as a second group of segments.

To perform a coloring process on the segments of the line patterns 712, 714, 716, and 718, no additional graphic pattern analysis is required. FIG. 7B is a top view of mask assignments for layout patterns of the conductive paths of FIG. 7A. The assigning of mask patterns is performed by: assigning all odd-ordered segments in the first group of segments to a first mask 722; assigning all even-ordered segments in the second group of segments to a second mask 724; assigning all odd-ordered segments in the second group of segments to a third mask 726; and assigning all even-ordered segments in the first group of segments to a fourth mask 724. The masks 722 and 724 are for forming a first conductive layer in the IC, and the masks 726 and 728 are for forming a second conductive layer in the IC.

FIG. 7C is a top view of a mask 722 with inclusion of line end patterns 732 and 736 in accordance with one or more embodiment. The ends of the segments 712-1 and 716-1 of the lines 712 and 716 are extended by adding line end patterns 732 and 736 in order to provide sufficient landing regions for via plugs that connect the consecutive segments to be formed in different conductive layers, such as connecting segments 712-1 and 712-2 and connecting segments 716-1 and 716-2. The masks 724, 726, and 728 are similarly processed to extend the line patterns for via plug landing regions.

Figure 8:
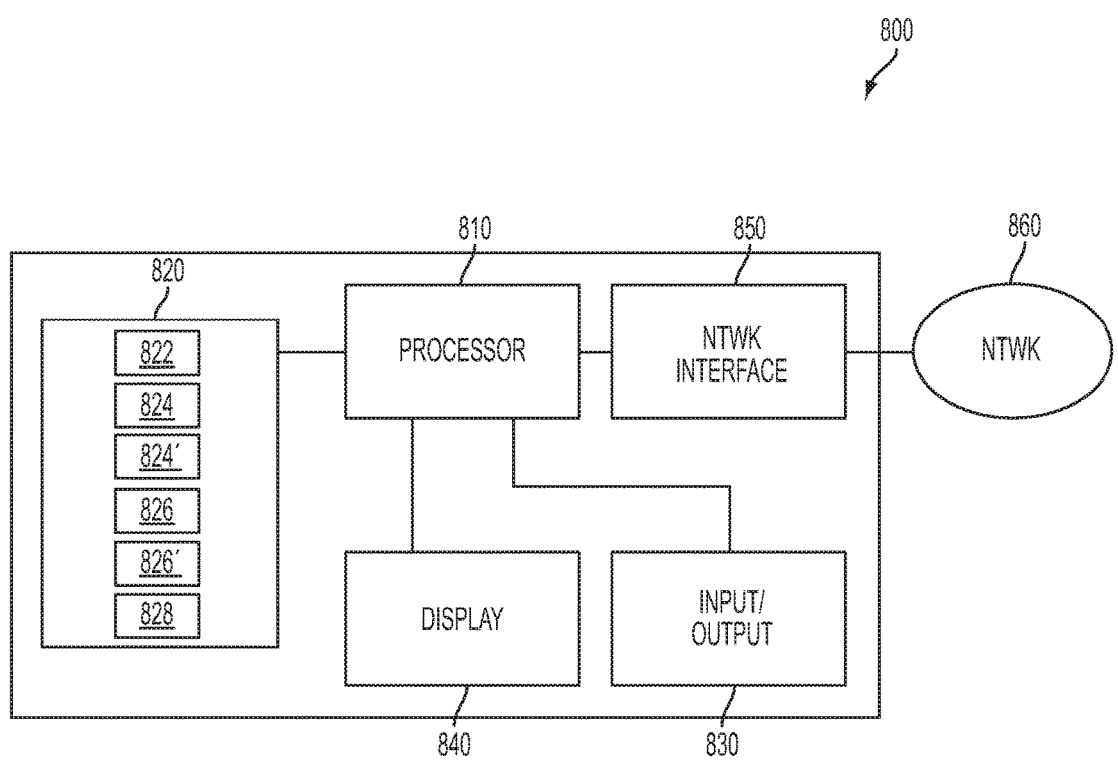
FIG. 8 is a functional block diagram of a computer system usable for implementing the method disclosed in FIG. 1 in accordance with one or more embodiments.

FIG. 8 is a functional block diagram of a computer system 800 usable for implementing the method disclosed in FIG. 1 in accordance with one or more embodiments. Computer system 800 includes the hardware processor 810 and a non-transitory, computer readable storage medium 820 encoded with, i.e., storing, the computer program code 822, i.e., a set of executable instructions. The processor 810 is electrically coupled to the computer readable storage medium 820. The processor 810 is configured to execute the computer program code 822 encoded in the computer readable storage medium 820 in order to cause the computer 800 to be usable as a Electronic Design Automation tool for performing a portion or all of the operations as depicted in FIG. 1.

In some embodiments, the processor 810 is a central processing unit (CPU), a multi-processor, a distributed processing system, an application specific integrated circuit (ASIC), and/or a suitable processing unit.

In some embodiments, the computer readable storage medium 820 is an electronic, magnetic, optical, electromagnetic, infrared, and/or a semiconductor system (or apparatus or device). For example, the computer readable storage medium 820 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 820 includes a compact disk-read only memory (CD-ROM), a compact disk-read/write (CD-R/W), and/or a digital video disc (DVD).

In some embodiments, the storage medium 820 stores the computer program code 822 configured to cause the computer system 800 to perform a method as depicted in FIG. 1. In some embodiments, the storage medium 820 also stores information needed for performing the method 100 or generated during performing the method 100, such as an original circuit design 824, an original layout 826, a revised circuit design 824', a revised layout 826', and/or a RC technology file 828.

The computer system 800 includes, in at least some embodiments, an input/output interface 830 and a display unit 840. The input/output interface 830 is coupled to the controller 810 and allows the circuit designer or a simulation model designer to manipulate the computer system 800 in order to perform the method depicted in FIG. 1. In at least some embodiments, the display unit 840 displays the status of operation of the method depicted in FIG. 1 in a real-time manner and preferably provides a Graphical User Interface (GUI). In at least some embodiments, the input/output interface 830 and the display 840 allow an operator to operate the computer system 800 in an interactive manner.

In at least some embodiments, the computer system 800 also includes a network interface 850 coupled to the processor 810. The network interface 850 allows the computer system 800 to communicate with a network 860, to which one or more other computer systems are connected. The network interface includes wireless network interfaces such as BLUETOOTH, WIFI, WIMAX, GPRS, or WCDMA; or wired network interface such as ETHERNET, USB, or IEEE-1394. In some embodiments, the method of FIG. 1 is implemented in two or more computer systems 800 of FIG. 7, and information such as the original circuit design, the original layout, and/or the RC technology file are exchanged between different computer systems via the network 860.

One aspect of this description relates to a semiconductor structure. The semiconductor structure includes a first conductive path extending in a first direction, wherein the first conductive path includes a first segment and a second segment, the first segment is in a first conductive layer, the second segment is in a second conductive layer different from the first conductive layer, and the first segment is electrically connected to the second segment. The semiconductor structure further includes a second conductive path extending in the first direction, wherein the second conductive path includes a third segment and a fourth segment, the third segment is in the first conductive layer, the fourth segment is in the second conductive layer, and the third segment is electrically connected to the fourth segment. The semiconductor structure further includes a third conductive path extending in the first direction, wherein the third conductive path is between the first conductive path and the second conductive path in a second direction perpendicular to the first direction, the third conductive path includes a fifth segment and a sixth segment, the fifth segment is in the second conductive layer, the sixth segment is in the first conductive layer, and the fifth segment is electrically connected to the sixth segment. An area of the first conductive layer between the first segment and the third segment is free of the sixth segment. In at least one embodiment, a length of the first segment is equal to a length of the second segment. In at least one embodiment, a length of the first segment is different from a length of the second segment. In at least one embodiment, a length of the first segment is equal to a length of the fourth segment. In at least one embodiment, a length of the first segment is different from a length of the fourth segment. In at least one embodiment, the first conductive path further comprises an additional segment, the additional segment is on the first conductive layer, and the second segment is electrically between the first segment and the additional segment. In at least one embodiment, the semiconductor structure further includes a fourth conductive path extending in the first direction, wherein the second conductive path is between the third conductive path and the fourth conductive path in the second direction, the fourth conductive path includes a seventh segment and an eighth segment, the seventh segment is in the second conductive layer, the eighth segment is in the first conductive layer, and the seventh segment is electrically connected to the eighth segment.

Another aspect of this description relates to a semiconductor structure. The semiconductor structure includes a first pair of differential signal lines extending in a first direction, wherein each differential signal line of the first pair of differential lines includes a first segment and a second segment, the first segment is in a first conductive layer, the second segment is in a second conductive layer different from the first conductive layer, and the first segment is electrically connected to the second segment for each corresponding differential signal line of the first pair of differential signal lines. The semiconductor structure further includes a second pair of differential signal lines extending in the first direction, wherein at least one differential signal line of the second pair of differential signal lines is between adjacent differential signal lines of the first pair of differential signal lines in a second direction perpendicular to the first direction, each differential signal line of the second pair of differential lines includes a third segment and a fourth segment, the third segment is in the second conductive layer, the fourth segment is in the first conductive layer, and the third segment is electrically connected to the fourth segment for each corresponding differential signal line of the second pair of differential signal lines. An area of the first conductive layer between first segments of the first pair of differential signal lines is free of the fourth segment of each differential signal line of the second pair of differential signal lines. In at least one embodiment, each segment of each differential signal line of the first pair of differential signal lines has a same length. In at least one embodiment, each segment of each differential signal line of the second pair of differential signal lines has a same length. In at least one embodiment, at least one segment of a first differential signal line of the first pair of differential signal lines has a different length from another segment of a second differential signal line of the first pair of differential signal lines. In at least one embodiment, at least one segment of a first differential signal line of the second pair of differential signal lines has a different length from another segment of a second differential signal line of the second pair of differential signal lines. In at least one embodiment, a first differential signal line of the first pair of differential signal lines is between adjacent differential signal lines of the second pair of differential signal lines. In at least one embodiment, the first conductive layer is farther from a substrate than the second conductive layer. In at least one embodiment, the first conductive layer is closer to a substrate than the second conductive layer.

Still another aspect of this description relates to a semiconductor structure. The semiconductor structure includes a first conductive path extending in a first direction, wherein the first conductive path includes a first segment and a second segment, the first segment is in a first conductive layer, the second segment is in a second conductive layer different from the first conductive layer, and the first segment is electrically connected to the second segment. The semiconductor structure further includes a second conductive path extending in the first direction, wherein the second conductive path includes a third segment and a fourth segment, the third segment is in the first conductive layer, the fourth segment is in the second conductive layer, and the third segment is electrically connected to the fourth segment. The semiconductor structure further includes a third conductive path extending in the first direction, wherein the third conductive path is between the first conductive path and the second conductive path in a second direction perpendicular to the first direction, the third conductive path includes a fifth segment and a sixth segment, the fifth segment is in the second conductive layer, the sixth segment is in the first conductive layer, and the fifth segment is electrically connected to the sixth segment. A first area of the first conductive layer extending in the second direction is free of the first segment, and the first area of the first conductive layer contains the third segment and the sixth segment. In at least one embodiment, a second area of the first conductive layer extending in the second direction is free of at least one of the third segment or the sixth segment, and the second area of the first conductive layer contains the first segment. In at least one embodiment, the semiconductor structure further includes a fourth conductive path extending in the first direction, wherein the second conductive path is between the third conductive path and the fourth conductive path in the second direction, the fourth conductive path includes a seventh segment and an eighth segment, the seventh segment is in the second conductive layer, the eighth segment is in the first conductive layer, and the seventh segment is electrically connected to the eighth segment. In at least one embodiment, the first area of the first conductive layer is free of the eighth segment. In at least one embodiment, a second area of the first conductive layer extending in the second direction is free of at least one of the third segment or the sixth segment, and the second area of the first conductive layer contains the first segment and the eighth segment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A semiconductor structure comprising:
 a first conductive path extending in a first direction, wherein the first conductive path comprises a first segment and a second segment, the first segment is in a first conductive layer, the second segment is in a second conductive layer different from the first con- ductive layer, and the first segment is electrically connected to the second segment;

a second conductive path extending in the first direction, wherein the second conductive path comprises a third segment and a fourth segment, the third segment is in the first conductive layer, the fourth segment is in the second conductive layer, and the third segment is electrically connected to the fourth segment; and a third conductive path extending in the first direction, wherein the third conductive path is between the first conductive path and the second conductive path in a second direction perpendicular to the first direction, the third conductive path comprises a fifth segment and a sixth segment, the fifth segment is in the second conductive layer, the sixth segment is in the first conductive layer, and the fifth segment is electrically connected to the sixth segment, wherein an area of the first conductive layer between the first segment and the third segment is free of the sixth segment.

2. The semiconductor structure of claim 1, wherein a length of the first segment is equal to a length of the second segment.

3. The semiconductor structure of claim 1, wherein a length of the first segment is different from a length of the second segment.

4. The semiconductor structure of claim 1, wherein a length of the first segment is equal to a length of the fourth segment.

5. The semiconductor structure of claim 1, wherein a length of the first segment is different from a length of the fourth segment.

6. The semiconductor structure of claim 1, wherein the first conductive path further comprises an additional segment, the additional segment is on the first conductive layer, and the second segment is electrically between the first segment and the additional segment.

7. The semiconductor structure of claim 1, further comprising a fourth conductive path extending in the first direction, wherein the second conductive path is between the third conductive path and the fourth conductive path in the second direction, the fourth conductive path comprises a seventh segment and an eighth segment, the seventh segment is in the second conductive layer, the eighth segment is in the first conductive layer, and the seventh segment is electrically connected to the eighth segment.

8. A semiconductor structure comprising:

a first pair of differential signal lines extending in a first direction, wherein each differential signal line of the first pair of differential lines comprises a first segment and a second segment, the first segment is in a first conductive layer, the second segment is in a second conductive layer different from the first conductive layer, and the first segment is electrically connected to the second segment for each corresponding differential signal line of the first pair of differential signal lines; and a second pair of differential signal lines extending in the first direction, wherein at least one differential signal line of the second pair of differential signal lines is between adjacent differential signal lines of the first pair of differential signal lines in a second direction perpendicular to the first direction, each differential signal line of the second pair of differential lines comprises a third segment and a fourth segment, the third segment is in the second conductive layer, the fourth segment is in the first conductive layer, and the third segment is electrically connected to the fourth segment for each corresponding differential signal line of the second pair of differential signal lines, wherein an area of the first conductive layer between first segments of the first pair of differential signal lines is free of the fourth segment of each differential signal line of the second pair of differential signal lines.

9. The semiconductor structure of claim 8, wherein each segment of each differential signal line of the first pair of differential signal lines has a same length.

10. The semiconductor structure of claim 9, wherein each segment of each differential signal line of the second pair of differential signal lines has a same length.

11. The semiconductor structure of claim 8, wherein at least one segment of a first differential signal line of the first pair of differential signal lines has a different length from another segment of a second differential signal line of the first pair of differential signal lines.

12. The semiconductor structure of claim 11, wherein at least one segment of a first differential signal line of the second pair of differential signal lines has a different length from another segment of a second differential signal line of the second pair of differential signal lines.

13. The semiconductor structure of claim 8, wherein a first differential signal line of the first pair of differential signal lines is between adjacent differential signal lines of the second pair of differential signal lines.

14. The semiconductor structure of claim 8, wherein the first conductive layer is farther from a substrate than the second conductive layer.

15. The semiconductor structure of claim 8, wherein the first conductive layer is closer to a substrate than the second conductive layer.

16. A semiconductor structure comprising:

a first conductive path extending in a first direction, wherein the first conductive path comprises a first segment and a second segment, the first segment is in a first conductive layer, the second segment is in a second conductive layer different from the first conductive layer, and the first segment is electrically connected to the second segment;

a second conductive path extending in the first direction, wherein the second conductive path comprises a third segment and a fourth segment, the third segment is in the first conductive layer, the fourth segment is in the second conductive layer, and the third segment is electrically connected to the fourth segment; and a third conductive path extending in the first direction, wherein the third conductive path is between the first conductive path and the second conductive path in a second direction perpendicular to the first direction, the third conductive path comprises a fifth segment and a sixth segment, the fifth segment is in the second conductive layer, the sixth segment is in the first conductive layer, and the fifth segment is electrically connected to the sixth segment, wherein a first area of the first conductive layer extending in the second direction is free of the first segment, and the first area of the first conductive layer contains the third segment and the sixth segment.

17. The semiconductor structure of claim 16, wherein a second area of the first conductive layer extending in the second direction is free of at least one of the third segment or the sixth segment, and the second area of the first conductive layer contains the first segment.

18. The semiconductor structure of claim 16, further comprising a fourth conductive path extending in the first direction, wherein the second conductive path is between the third conductive path and the fourth conductive path in the second direction, the fourth conductive path comprises a seventh segment and an eighth segment, the seventh segment is in the second conductive layer, the eighth segment is in the first conductive layer, and the seventh segment is electrically connected to the eighth segment.

19. The semiconductor structure of claim 18, wherein the first area of the first conductive layer is free of the eighth segment.

20. The semiconductor structure of claim 18, wherein a second area of the first conductive layer extending in the second direction is free of at least one of the third segment or the sixth segment, and the second area of the first conductive layer contains the first segment and the eighth segment.

\* \* \* \* \*